United States Patent [19]
Sarnoff et al.

[11] 3,795,061
[45] Mar. 5, 1974

[54] TRAINING INJECTOR
[75] Inventors: Stanley J. Sarnoff; George B. Calkins, both of Bethesda, Md.
[73] Assignee: Survival Technology, Inc., Bethesda, Md.
[22] Filed: Mar. 21, 1973
[21] Appl. No.: 343,276

[52] U.S. Cl. ............................. 35/17, 128/218 F
[51] Int. Cl. ......................................... G09b 23/28
[58] Field of Search ................... 35/17; 128/218 F

[56] References Cited
UNITED STATES PATENTS
3,426,448    2/1969    Sarnoff .................................. 35/17
3,712,301    1/1973    Sarnoff ............................. 128/218 F
3,742,948    7/1973    Post et al. ........................ 128/218 F

*Primary Examiner*—Harland S. Skogquist
*Attorney, Agent, or Firm*—Witherspoon and Lane

[57] ABSTRACT

A training injector for use in learning to administer medication to one's self or another, said injector having a blunt prod which is spring projected to simulate the action of the needle in an automatic injector.

4 Claims, 9 Drawing Figures

PATENTED MAR 5 1974 3,795,061
SHEET 1 OF 2
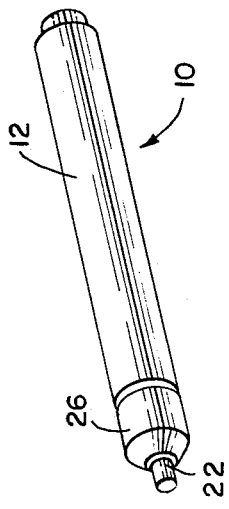
FIG. 2.
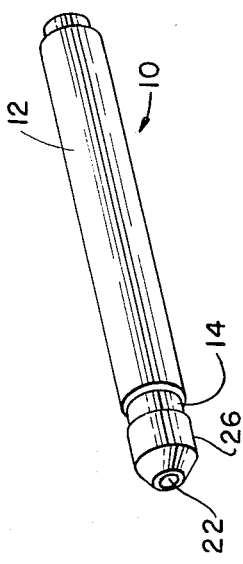
FIG. 1.
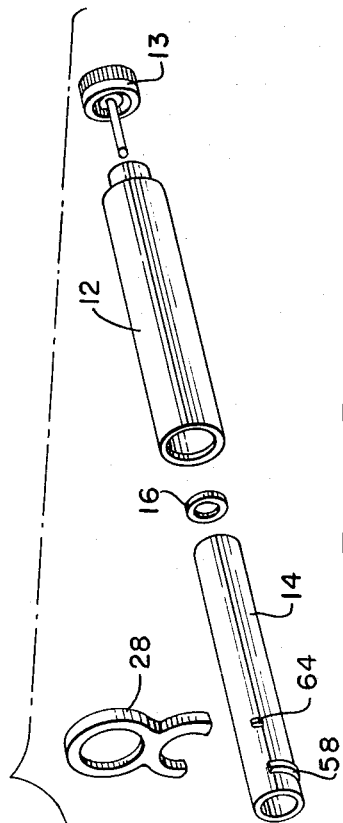
FIG. 3.
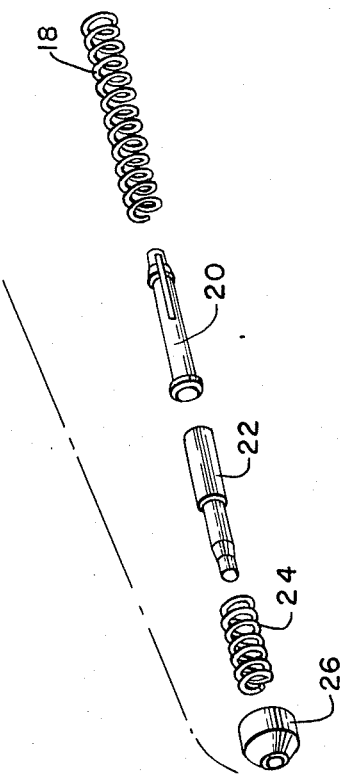

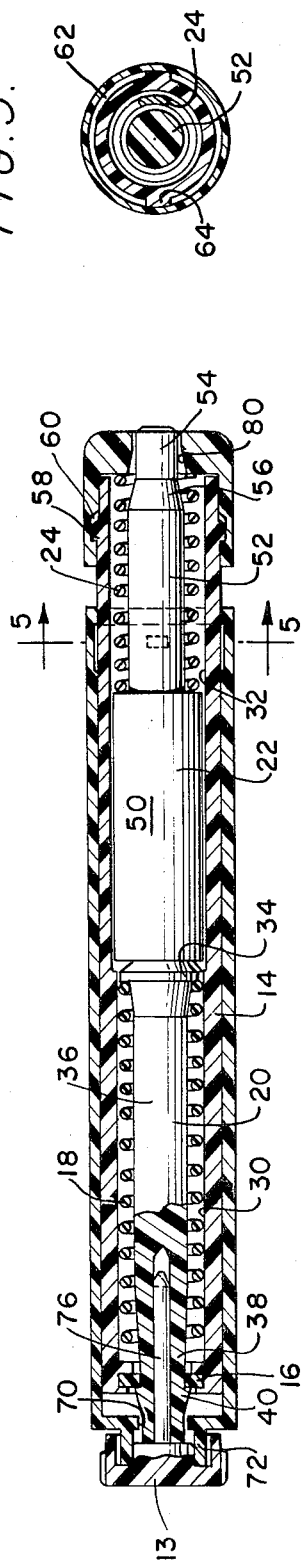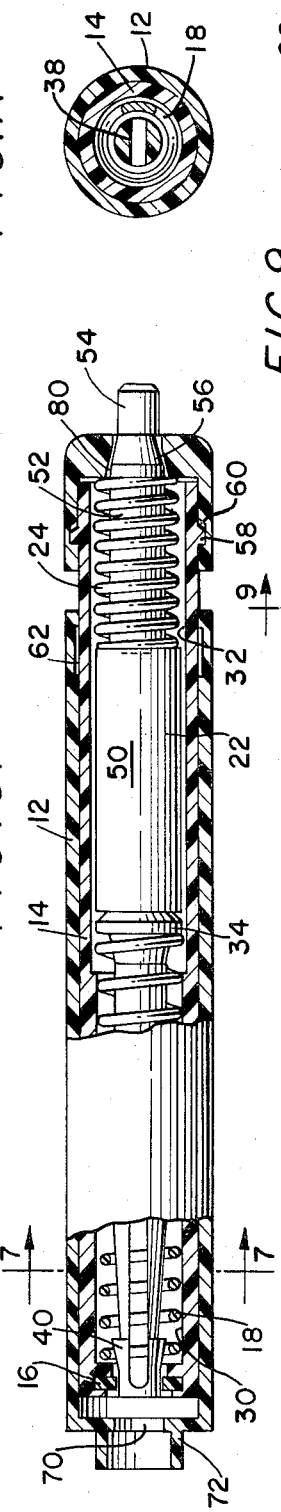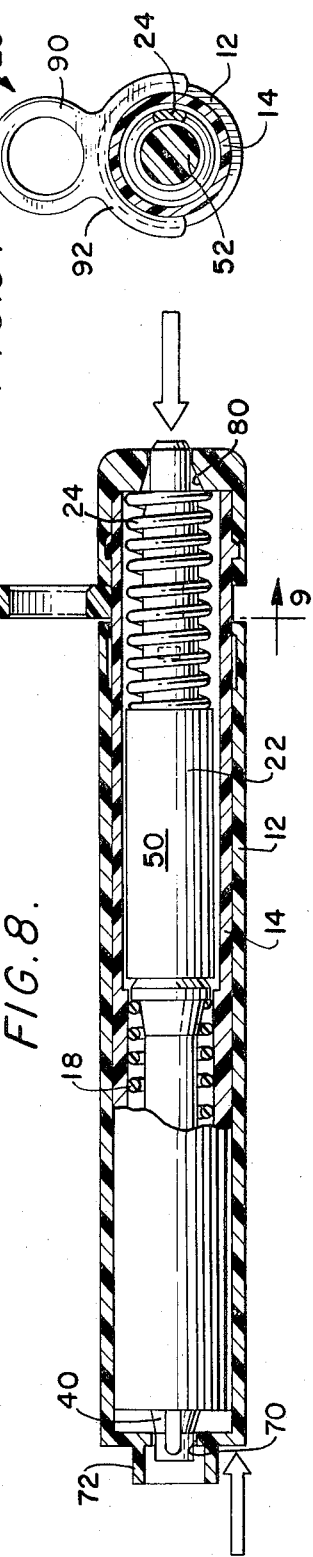

TRAINING INJECTOR

BACKGROUND AND OBJECTS

It is well known that many persons are quite fearful of any type of needle injection, hence it is most important that such fears be overcome particularly where self-administration is dictated. A person's own life or that of a would-be patient might very well depend upon whether or not the party has been trained to use an automatic injector.

In view of the foregoing, it is an object of this invention to provide a training injector which simulates the action of an automatic injector.

It is another object to provide a training injector which may be readily recocked for repeated use.

It is yet another object of this invention to provide a training injector having a prod which is projected into contact with the body surface normally receiving the injection so as to simulate the needle contacting the skin surface.

IN THE DRAWINGS

FIG. 1 is a perspective view of the assembled training injector ready for use,

FIG. 2 is a perspective view of the training injector after firing with the prod protruding from the end cap, FIG. 3 is an exploded view of the components of the training injector, FIG. 4 is a sectional view showing the parts of the training injector in cocked position with the safety cap in position, FIG. 5 is a cross-sectional view taken along line 5—5 of FIG. 4, FIG. 6 is a partial sectional view illustrating the position of the injector parts after firing, FIG. 7 is a sectional view taken along line 7—7 of FIG. 6, FIG. 8 is a partial sectional view showing the manner in which the injector is cocked for use, and FIG. 9 is a cross-sectional view taken along line 9—9 of FIG. 8.

DETAILED DESCRIPTION

The components which make up the training injector 10 are illustrated in the exploded perspective view of FIG. 3 and include a cylindrical housing 12, a safety cap 13, a cylindrical barrel 14 which receives retainer ring 16 at its rear end, a helical drive spring 18, a collet 20, a prod 22, a return spring 24 and an end cap 26. A recocking tool 28 is provided to assist in recocking the injector for repeated use.

The training injector 10 in storage condition is shown in cross section in FIG. 4, while in FIG. 5 the device is depicted with the safety cap 13 removed and fired so that the prod 22 extends outwardly from the end cap 26. Specifically, cylindrical barrel 14 has its rearward end partly closed and mounts a retaining ring 16. The inside of the barrel is formed in two diameters, the rear inner surface 30 being smaller than the forward inner surface 32. The forward end of the barrel is completely open.

Collet 20 fits within the rear portion of the barrel 14 and comprises an enlarged head 34 sized to fit within the inner surface 30 of the barrel, said head being connected to a body 36 of reduced diameter. The body terminates in a plurality of resilient sections 38 each carrying an outwardly protruding locking lugs 40 which as shown bears against retainer ring 16 to maintain helical drive spring 18 positioned around the collet body 36 in retracted and compressed condition. The resilient portions 38 make it possible for locking lugs 40 to move radially inwardly and outwardly with respect to the longitudinal axis of the cylindrical barrel. It should be noted that drive spring 18 is at all times held between the rear end portion of the barrel and the rear face of collet head 34.

The prod 22 is slidably carried in the forward portion of the barrel 14 and comprises a rearward head 50 sized to fit within the barrel inner surface 32 and a forward body 52 of smaller diameter terminating in a punch rod 54 of even smaller diameter. There is a tapered transition portion 56 between body 52 and punch rod 54. A helical return spring 24 fits around prod body 52 with one end abutting head 50 and the other end resting against the inner face of end cap 26. The end cap 26 is held on band 14 by means of locking ribs 58 on the barrel engaging and fitting into an annular recess 60 in the end cap.

The barrel with assembled components as set forth above is slidably carried within cylindrical housing 12. The amount of back and forth sliding of the barrel within the housing is controlled by an internal annular groove 62 in the housing in cooperation with tabs 64 on the periphery of the barrel 14. The back end of the housing 12 has a central opening 70 sized to allow the rear end portion of collet 20 to pass therethrough. However, the locking lugs 40 are so sized that they will engage the edge of the opening 70 and be cammed inwardly for reasons to be described later. Rearwardly beyond the opening 70 there is a circular flange 72 concentric with said opening. The safety cap 13 fits down over the flange 72 with its safety pin 76 extending centrally down within the collet thereby preventing radially inward movement of the locking lugs 40.

The action and operation of the training injector is simple and effective. The training injector 10 is illustrated in FIG. 4 in the safety storage condition with the drive spring 18 in retracted and compressed condition ready for firing and with the punch rod 54 withdrawn into the end cap 26. It should be noted that the safety cap 13 is assembled with its locking pin 76 extending into the center of the collet body 38 to prevent displacement of locking lugs 40.

When it is desired to fire the injector, the safety cap 13 is removed and the end cap placed aginst the surface to receive the simulated injection. Next a downward force is impressed upon the housing 12 causing it to move toward the end cap 26 while the barrel remains stationary. This relative movement between the housing and the barrel causes the edge of opening 70 to cam the locking lugs 40 radially inwardly thereby forcing them from the retaining ring 16 and allowing the drive spring 18 to expand forcing collet head 34 into engagement with prod head 50 to force the punch rod 54 out the end of the end cap 26 as shown in FIG. 5. It should be noted that the opening 80 in the end cap 26 is tapered to conform to the taper prod portion 56 so that movement of the prod will be accordingly stopped by the abutting of the prod section 56 against the wall of the tapered opening 80. The return spring 24 is compressed as the prod moves toward the end cap and serves to prevent an undue proportion of the driving force of the drive spring 18 from being received by the end cap when the prod is stopped thereby.

Since the training injector is to be used for repeated exercises, it is desirable that it be readily reset. Referring to FIG. 8, it is obvious that in order to reset the device the drive spring 18 must be compressed and the locking lugs 40 forced back through retainer ring 16 and beyond so that they may spring radially outwardly and be held by the said ring. Further, it is desirable that the cocking action be similar to firing so that confusion is laterally negated. Accordingly, in order to prevent movement between the barrel and the housing for the distance required to cock the device, a cocking tool 28 has been provided. For convenience the cocking tool 28 is provided with a circular grip 90 having a generally semi-circular spacer 92 extending therefrom. The diameter of the spacer 92 is sized to snugly fit over the barrel 14 between the end cap and housing. With the cocking tool 28 in such position and the punch rod 54 placed against a firm support downward movement of the housing will force the back end of the collet 20 through the retaining ring 16 far enough so that the locking lugs 40 will engage the locking ring 16 under tension of drive spring 18 as shown in FIG. 4. After this, the safety cap 13 is assembled onto the unit with its locking pin 76 in position to prevent inward movement of locking lugs 40. After this, the cocking tool 28 is removed and the device is ready for storage until next use.

We claim:

1. A training injector comprising:
    a cylindrical housing;
    a cylindrical barrel carried within the housing for limited reciprocation therein, said cylindrical barrel having a rearward end partially closed and mounting a retainer ring;
    a collet having a body with a resilient locking head on its back end portion and an enlarged drive head on the forward end, said collet being positioned within the cylindrical barrel with its resilient locking head engaging the retaining ring to fix the position of the collet in the barrel;
    a drive spring positioned in the barrel and held in compressed condition between the rearward end of the barrel and the collet drive head;
    an end cap attached to the forward end of the barrel, said end cap having a central opening therein,
    a prod fitting within the cylindrical barrel, said prod having a prod head in engagement with the collet head and a punch rod sized to extend through the cap opening,
    a return spring fitted over the prod and held in compressed condition between the prod head and the end cap, and
    cooperating means on the barrel and the housing to limit sliding reciprocation therebetween.

2. The training injector of claim 1 and wherein means are provided on the housing to cam the locking head inward upon relative movement of the barrel and housing to clear the retaining ring and allow the drive spring to force the punch rod out the opening in the end cap.

3. The training injector of claim 2 and wherein a safety cap is fitted over the rearward end of the housing, said safety cap having means for preventing inward movement of the collet locking head.

4. The invention as set forth in claim 1 and wherein a cocking tool is provided, said cocking tool having a spacer element fitting between the back edge of the end cap and forward edge of the housing to limit relative movement of the housing and barrel so that movement of the punch rod toward the rear of the barrel will cause the collet locking head to be held by the retainer ring.

* * * * *